Jan. 12, 1943.   G. C. FIELDS   2,308,165

MIXING VALVE

Filed June 10, 1939

Inventor.
George C. Fields.
by Parker & Carter
Attorneys.

Patented Jan. 12, 1943

2,308,165

UNITED STATES PATENT OFFICE 2,308,165

MIXING VALVE

George C. Fields, South Bend, Ind., assignor to The Dole Valve Company, Chicago, Ill., a corporation of Illinois Application June 10, 1939, Serial No. 278,540

9 Claims. (Cl. 236—12)

This invention relates to mixing valves and has for its object to provide a new and improved device of this description.

The invention has as a further object to provide a mixing valve for mixing hot and cold liquids so as to maintain the mixed liquids at substantially a predetermined temperature for which the device is set. The invention has as a further object to provide a mixing valve for mixing hot and cold liquids to provide a mixture of a predetermined temperature and which will not be affected by pressure differentials and temperature changes when set to provide a mixed liquid of a given temperature.

The device is particularly adapted for use in delivering water to washing machines for washing materials which might be injured by a variation in the temperature of the water, and for use in hospitals, showers, rubber baths, and in any other place where it is necessary or desirable to hold the temperature of the mixed water within certain specified limits.

The invention has as a further object to provide a mixing valve wherein the movement of the valve member is not directly controlled by the thermostat, but is indirectly controlled thereby. The invention has as a further object to provide a mixing valve wherein the movement of the valve member which controls the admission of the hot and cold liquid, is brought about by the liquid itself so that the thermostat is relieved of the work necessary to move this control valve.

The invention has as a further object to provide a mixing valve where there is a thermostat which, acting under variations in temperature, varies the pressure in the valve chamber so that this variation in temperature causes the movement of the valve which controls the admission of the hot and cold liquids. The invention has as a further object to provide a mixing valve wherein the control valve for controlling the hot and cold liquid, when the device is set for a certain temperature, will be maintained in substantially the same position.

The invention has further objects which are more particularly pointed out in the accompanying description.

Referring now to the drawing.

Like numerals refer to like parts throughout the several figures.

Figure 1:
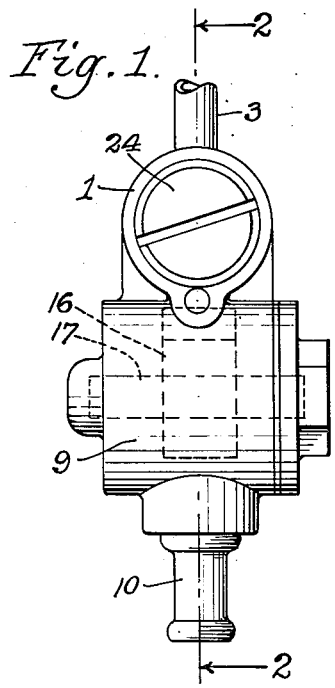
Fig. 1 is a view of one form of device embodying the invention.

Referring now to Figs. 1 to 4 inclusive, the device consists of a casing 1 having the two inlets 2 and 3, one for the hot liquid and one for the cold liquid. Within the casing is a liquid controlling device which consists of the two pistons 4 and 5 connected together by the connecting member 6. Connected with the connecting member 6, intermediate the pistons 4 and 5, is the valve member 7 which controls the admission of the hot and cold liquids. The hot and cold liquids pass down through the casing 1 and through the opening 8 into the chamber 9 and thence through the outlet 10.

The pistons 4 and 5 are more or less loosely mounted in the casing 1 so that liquid may pass by them. The liquid which passes by the piston 5 passes through the opening 11 into the passageway 12. The liquid that passes by the piston 4 passes through the opening 13 into the passageway 14. A controlling member 15 controls the liquid escaping through the passageways 12 and 14 and is connected to one end of a thermostat 16, the other end of which thermostat is connected to a fixed part 17. The controlling member 15 is connected to the members 18 and 19 which extend into the passageways 12 and 14. The member 18 is provided with the enlargement 20 and the member 19 is provided with the enlargement 21, see Fig. 4. The end of the thermostat 16, which is preferably a bimetal thermostat, is connected to the member 15 in any desired manner, as by means of a groove 22 in said member. The member 15 is preferably arranged so that when in its normal position, it substantially closes the ends of both passageways 12 and 14. The thermostat, when the temperature varies from that for which the device is set, moves the member 15 one way or the other and this movement causes one of its ends to enter either the passageway 12 or the passageway 14.

I prefer to provide some means for preventing abrupt movement of the valve member 7. One construction for this purpose is shown. In this construction the removable end pieces 23 and 24 for the valve member are provided with members 25 and 26 which enter openings 27 and 28 in the connecting member 6, so as to form a dashpot construction.

Figure 2:
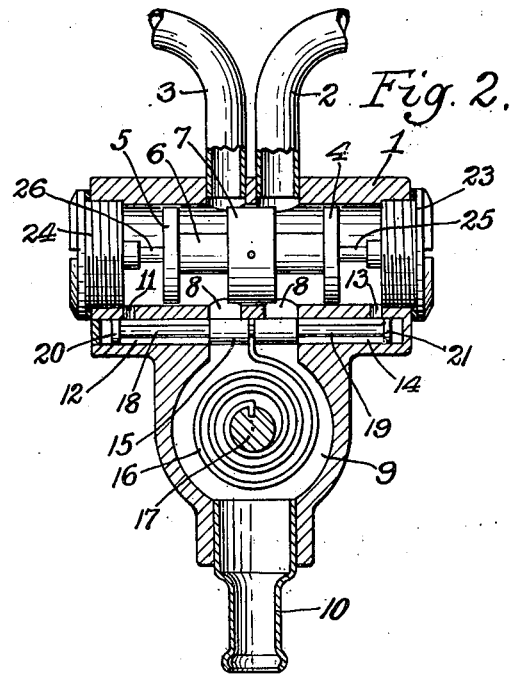
Fig. 2 is a sectional view taken on line 2—2 of Fig. 1.
Figure 5:
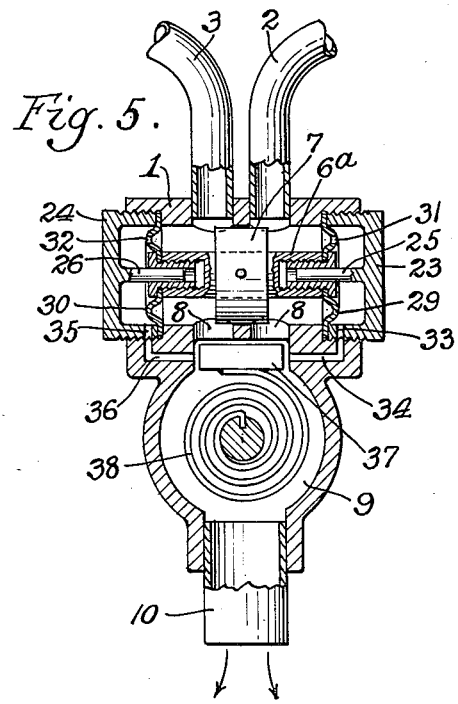
Fig. 5 is a sectional view showing a modified construction.
Figure 3:
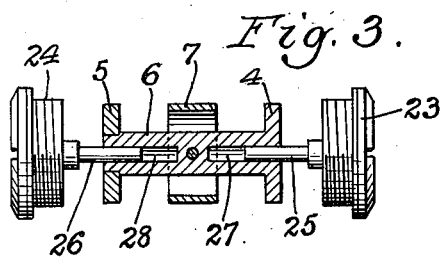
Fig. 3 is a view of the valve and associated parts that controls the hot and cold liquids, in part section.
Figure 4:
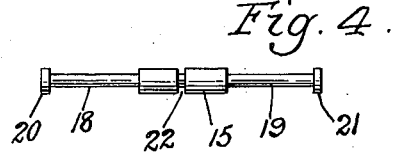
Fig. 4 is a view of the controlling member for the liquid controlling valve.

In Fig. 5 there is shown a construction similar in every way to that shown in Fig. 2 except that instead of using pistons 4 and 5, there are provided diaphragms 29 and 30 which are connected to the connecting member 6a. These diaphragms may be made of any desired manner and are provided with openings 31 and 32 through which the liquid passes. The liquid passing through opening 31 in the diaphragm 29 passes through the opening 33 and into the passageway 34 and the liquid passing through opening 32 in the diaphragm 30 passes through opening 35 into the passageway 36. Located between the ends of the passageways 34 and 36 is a controlling member 37 to which is connected the thermostat 38. The mixed liquid passes down into the chamber 9 and out the outlet 10 and makes contact with the thermostat and when the temperature varies, the controlling member 37 is moved one way or the other, depending upon the variation in temperature, so as to control the amount of hot and cold liquid passing into the valve.

The use and operation of my invention are as follows.

In the construction shown in Figs. 1 to 4, the hot liquid, for example, may enter through the inlet 3 and the cold liquid through the inlet 2. This mixed liquid then passes down into the chamber 9 and into contact with the thermostat 16. A part of the liquid passes by the piston 5 and down into the passageway 12. A part of the liquid also passes by the piston 4 and into the passageway 14. If now the temperature of the mixed liquid is too high, the thermostat causes the controlling member 15 to move to the right, see Fig. 2, so that the right hand end moves toward the passageway 14 and the left hand end moves toward the passageway 12. This lowers the pressure to the left of the piston 5 and increases the pressure to the right of the piston 4, and this variation in pressure causes the pistons and the valve member 7 to be moved to the left. This causes more cold liquid to enter through the inlet 2 and less hot liquid to enter through the inlet 3. This lowers the temperature of the liquid brought into contact with the thermostat so as to cause the thermostat to act to move the controlling member 15 in the opposite direction until the temperature of the mixed liquid is brought to the desired temperature, that is, the temperature for which the device is set.

If the temperature of the liquid becomes too cold, the thermostat moves the controlling member 15 away from the passageway 14 and toward the passageway 12. This relieves the pressure in the passageway 14 and on the right hand side of the piston 4 and increases the pressure in the passageway 12 and on the left hand side of the piston 5. This causes the pistons 4 and 5 and the valve member 7 to be moved toward the right, causing more hot liquid to enter and less cold liquid to enter. When the temperature of the mixed liquid reaches the predetermined point for which the device is set, the thermostat moves the controlling member 15 back to its initial position.

In the device shown in Fig. 5 the operation is the same. When the temperature of the liquid rises above the temperature for which the device is set, the thermostat 38 moves the controlling member 37 to the right so as to reduce the flow of the liquid out of the passageway 34 and increases the flow of liquid out of the passageway 36, thus raising the pressure to the right of the diaphragm 29 and lowering the pressure to the left of the diaphragm 30. This causes the diaphragms to move the valve member 7 to the left so as to decrease the amount of hot liquid and increase the amount of cold liquid passing into the device. When the temperature of the mixed liquid reaches the temperature for which the device is set, the thermostat moves the controlling member 37 back to its initial position. If the liquid becomes too cold, the thermostat moves the control member 37 in the opposite direction so as to produce an opposite movement of the valve member 7 to admit more hot liquid and less cold liquid into the device.

With this particular construction, when the device is set to deliver liquid at a certain temperature, the controlling member 15 will be normally in the position shown in Fig. 2, where it substantially closes the ends of both passageways 12 and 14, and it will remain substantially in this position and whatever variation is made in this position, will be exceedingly small, so that the temperature of the liquid delivered by the device is maintained substantially constant.

It will further be noted that in this device, there is no increase in power or work required of the thermostat as the device, the movement of which it controls, increases in size or weight. In other words, a piece of bimetal having very little strength can cause the movement of large devices, the movement of which requires great force.

I claim:

1. A mixing valve comprising a horizontally extending casing having two inlets longitudinally of the casing for the liquids of different temperatures in proximity to each other and in alignment longitudinally of the casing, a single valve device for controlling the two inlets, located intermediate the two inlets and comprising a unitary ring, the opposite ends of which act to cover and uncover the respective inlets, an actuating device for said valve device, comprising two pressure receiving parts connected with, and at opposite ends of, said valve device and separated therefrom by a space extending circumferentially of the casing and between which said two inlets are located, a controlling device for varying the pressure on said pressure receiving parts, so as to cause them and the valve device to move, to vary the relative amount of hot and cold liquids entering said casing, and a thermostat for controlling said controlling device located in a chamber separate from that containing the single valve device.

2. A liquid controlled mixing valve comprising a horizontally extending casing having two inlets longitudinally of the casing for the liquids of different temperatures in proximity to each other and in alignment longitudinally of the casing, a single valve device for controlling said inlets, comprising a unitary ring, the opposite ends of which act to cover and uncover the respective inlets, two pressure receiving parts connected with, and at opposite ends of, said valve device, located on opposite sides of said inlets, said casing having a chamber in which said valve device and pressure receiving parts are movably mounted, means for permitting liquid to move past said pressure receiving parts, a controlling member for decreasing the amount of liquid passing by either of said pressure receiving parts, and a thermostat for actuating said controlling member, said valve device and the actuating device therefor being moved by the pressure of the liquid alone.

3. A mixing valve comprising a horizontally extending casing having two inlets longitudinally of the casing for the liquids of different temperatures in proximity to each other and in alignment longitudinally of the casing, a single valve device for controlling said inlets, comprising a unitary ring, the opposite ends of which act to cover and uncover the respective inlets, two pressure receiving devices connected with, and at opposite ends of, said valve device, one on each side thereof, said casing being provided with a chamber in which said pressure receiving devices and said valve device are received, means associated with each of said pressure receiving devices for letting liquid pass beyond them into the end portions of said chamber, passageways leading from the end portions of said chamber and having their ends adjacent, a controlling member in alignment with said valve device and opposed to the adjacent ends of said passageways, and a thermostatic device for controlling said controlling member.

4. A liquid controlled mixing valve comprising a horizontally extending casing having two inlets longitudinally of the casing for the liquids of different temperatures in proximity to each other and in alignment longitudinally of the casing, a single valve device for controlling said inlets and located intermediate said inlets, comprising a unitary ring, the opposite ends of which act to cover and uncover the respective inlets, two pressure receiving devices connected with, and at opposite ends of, said valve device, one on each side thereof, said casing being provided with a chamber in which said pressure receiving devices and said valve device are received and enclosed, means associated with each of said pressure receiving devices for letting liquid pass beyond them into the end portions of said chamber out of contact with said valve device, passageways leading from the end portions of said chamber, through which liquid from the end portions of said chamber may escape, and a controlling device responsive to variations in temperature, for controlling the escape of the liquid from either of said passageways, so as to build up a pressure in the end of the chamber with which such passageway is connected, to cause the pressure to move said valve device to vary inversely the amount of liquid passing through said inlets said valve device and the actuating device therefor being moved by the pressure of the liquid alone.

5. A liquid controlled mixing valve comprising a horizontally extending casing having two inlets longitudinally of the casing for the hot and cold liquids in proximity to each other and in alignment longitudinally of the casing, a chamber with which said inlets are connected, a single valve device located in said chamber for inversely controlling said inlets, comprising a unitary ring, the opposite ends of which act to cover and uncover the respective inlets, two pressure receiving devices in said chamber, connected with, and at opposite ends of, said valve device and on opposite sides thereof, means associated with said pressure receiving devices for letting liquid pass beyond them into the end portions of said chamber out of contact with said valve device, and means responsive to temperature changes of the mixed liquid, for varying inversely the pressure in the two ends of said chamber, to cause said valve device to move to vary the amount of hot and cold liquid entering said chamber said valve device and the actuating device therefor being moved by the pressure of the liquid alone.

6. A mixing valve comprising a horizontally extending casing having two inlets longitudinally of the casing for the hot and cold liquids in proximity to each other and in alignment longitudinally of the casing, a chamber with which said inlets are connected, a single valve device located in said chamber for inversely controlling said inlets, two pressure receiving devices in said chamber, connected with, and at opposite ends of said valve device and on opposite sides thereof, means associated with said pressure receiving devices for letting liquid pass beyond them into the end portions of said chamber out of contact with said valve device, means responsive to temperature changes of the mixed liquid, for varying inversely the pressure in the two ends of said chamber, to cause said valve device to move to vary the amount of hot and cold liquid entering said chamber, and a retarding device for retarding the movement of said pressure receiving devices, said retarding device comprising pins set in plugs at opposite ends of the chamber and projecting into holes which extend into the pressure receiving devices.

7. A mixing valve comprising a horizontally extending casing having two inlets longitudinally of the casing for the liquids of different temperatures in proximity to each other and in alignment longitudinally of the casing, a single valve device for controlling said inlets, two pressure receiving devices connected with, and at opposite ends of said valve device, one on each side thereof, said casing being provided with a chamber in which said pressure receiving devices and said valve device are received, means associated with each of said pressure receiving devices for letting liquid pass beyond them into the end portions of said chamber out of contact with said valve device, passageways leading from the end portions of said chamber and having adjacent ends in proximity to each other, a controlling device located between said adjacent ends, and a thermostatic device responsive to variations in temperature, for moving the controlling device into the end of one of said passageways and out of the end of the other passageway.

8. A mixing valve comprising a horizontally extending casing having two inlets longitudinally of the casing for the liquids of different temperatures in proximity to each other and in alignment longitudinally of the casing, a single valve device for controlling said inlets, two pressure receiving devices connected with, and at opposite ends of, said valve device, one on each side thereof, said casing being provided with a chamber in which said pressure receiving devices and said valve devices are received, means associated with each of said pressure receiving devices for letting liquid pass beyond them into the end portions of said chamber out of contact with said valve device, passageways leading from the end portions of said chamber and having adjacent ends in proximity to each other, a controlling device located between said adjacent ends, a thermostatic device responsive to variations in temperature, for moving the controlling device into the end of one of said passageways and out of the end of the other passageway, and members connected with said controlling device and extending into said passageways, said members having enlargements thereon.

9. A mixing valve comprising a horizontally extending casing having two inlets longitudinally of the casing for the hot and cold liquids in proximity to each other and in alignment longitudinally of the casing, a single valve device simultaneously engaging said two inlets for inversely controlling said inlets, two pressure receiving devices connected with, and at opposite ends of, said valve devices, means associated with said pressure receiving devices for letting liquid pass beyond them, a pressure chamber associated with each pressure receiving device, passageways leading from the outer faces of said pressure chambers and having their ends adjacent, a controlling member associated with the adjacent ends of said passageways, and a thermostatic device for controlling said controlling member.

GEORGE C. FIELDS.